(12) United States Patent
Matsuno et al.

(10) Patent No.: US 8,020,812 B2
(45) Date of Patent: Sep. 20, 2011

(54) CLAMP FOR CORRUGATED TUBE

(75) Inventors: Hiroto Matsuno, Toyohashi (JP); Masato Ibaraki, Yokkaichi (JP)

(73) Assignee: Newfrey LLC, Newark, DE (US)

(*) Notice: Subject to any disclaimer, the term of this patent is extended or adjusted under 35 U.S.C. 154(b) by 0 days.

(21) Appl. No.: 12/633,328

(22) Filed: Dec. 8, 2009

(65) Prior Publication Data

US 2010/0148015 A1    Jun. 17, 2010

(30) Foreign Application Priority Data

Dec. 8, 2008 (JP) .................................. 2008-312612

(51) Int. Cl.
  *F16B 15/00* (2006.01)
  *A44B 11/25* (2006.01)

(52) U.S. Cl. ........... 248/71; 248/74.1; 248/74.2; 24/336

(58) Field of Classification Search .................... 248/71, 248/73, 74.1, 74.2, 74.4; 24/336, 543
  See application file for complete search history.

(56) References Cited

U.S. PATENT DOCUMENTS

| | | | | |
|---|---|---|---|---|
| 3,126,184 A | * | 3/1964 | Kropp | 248/73 |
| 3,991,960 A | * | 11/1976 | Tanaka | 248/68.1 |
| 4,386,752 A | * | 6/1983 | Pavlak et al. | 248/73 |
| 4,669,156 A | * | 6/1987 | Guido et al. | 24/336 |
| 5,367,750 A | * | 11/1994 | Ward | 24/16 PB |
| 6,809,257 B2 | * | 10/2004 | Shibuya | 174/481 |
| 7,007,900 B2 | * | 3/2006 | Goodwin et al. | 248/68.1 |
| 7,172,162 B2 | * | 2/2007 | Mizukoshi et al. | 248/68.1 |
| 2004/0182973 A1 | * | 9/2004 | Kawai | 248/71 |

FOREIGN PATENT DOCUMENTS

| | | |
|---|---|---|
| JP | 2-34883 | 3/1990 |
| JP | 2003-018727 | 1/2003 |
| JP | 2006-138445 | 6/2006 |

* cited by examiner

*Primary Examiner* — Anita M King
(74) *Attorney, Agent, or Firm* — Harness, Dickey & Pierce, P.L.C.

(57) ABSTRACT

A clamp for corrugated tubes capable of holding a corrugated tube, whether a corrugated tube of large diameter or a corrugated tube of small diameter, with adequate holding force. The clamp comprises a main fastener body, a body attachment part for attaching the main fastener body to a body panel, and a fastener cover that turns about a hinge of the main fastener body and presses and holds a corrugated tube to the main fastener body, which fastener cover comprises a small corrugated tube fastener cover for pressing against a corrugated tube of small diameter, and large corrugated tube fastener covers for pressing against a corrugated tube of large diameter, which small corrugated tube fastener cover and large corrugated tube fastener covers are arranged so as to be aligned in the axial direction of the corrugated tube being pressed against and held, and which, respectively, are coupled by the hinge to the main fastener body so that, with the main fastener body, they can separately press and hold a corrugated tube on the main fastener body.

15 Claims, 6 Drawing Sheets

CLAMP FOR CORRUGATED TUBE

CROSS REFERENCE TO RELATED APPLICATIONS

The present application claims priority under 35 USC §119 to Japanese Application No. Y1P0670, filed Dec. 8, 2008, the entire contents of which are incorporated herein by reference.

The present invention relates to a clamp for corrugated tubes for attaching a corrugated tube to a body panel, which clamp for corrugated tubes can hold corrugated tubes of differing diameters.

BACKGROUND OF THE INVENTION

Corrugated tubes have circumferential grooves aligned in multiple steps in the longitudinal direction and can withstand bending, for which reason wire harnesses and the like are often used in automobile body panels. Clamps for attaching corrugated tubes to body panels are known. A clamp for corrugated tubes described in JP H2-034883/1990 comprises a main fastener body for mounting and holding a corrugated tube, a body attachment part for attaching the main fastener body to a body panel and a fastener cover that is coupled by a hinge to the main fastener body and capable of turning so as to close the main fastener body, for pressing a corrugated tube, mounted in the main fastener body in the closed state wherein the main fastener body has been closed, against the main fastener body, and working in concert with the main fastener body to hold the corrugated tube.

In the fastener cover of the clamp, cited in JP H2-034883/1990, elastic pressing pieces are provided which protrude on the main fastener body side, for handling cases where the diameters of the corrugated tubes being held differ. With this fastener cover, when seeking to hold a corrugated tube of small diameter, the elastic pressing pieces try to press against the main fastener body, but that pressing force is small; therefore, there is a danger that the corrugated tube will wobble, and that it will not be possible to hold them adequately.

In JP 2003-018727, a clamp is described which comprises a tube fastener for fastening a corrugated tube, and a harness fastener, formed integrally [with] and adjacent to the tube fastener, for winding [about] a wire harness coming from the tube fastener. This clamp is not for fastening a corrugated tube to a body panel, but is rather for fastening a wire harness to a corrugated tube. The harness fastener comprises a band. The band is tightly tightened with the harness fastener that is wound [about] a wire harness, and in this way, the tube fastener adjacent to the harness fastener is fastened to the wire harness. Accordingly, there is no structure in the clamp of JP 2003-018727 for attaching corrugated tubes of differing diameter to a body panel.

The clamp of JP 2006-138445 comprises a main fastener body for mounting and holding a corrugated tube and a fastener cover that is coupled by a hinge to the main fastener body, capable of turning so as to close the main fastener body for pressing a corrugated tube, mounted in the main fastener body in the closed state wherein the main fastener body has been closed, against the main fastener body, and working in concert with the main fastener body to hold the corrugated tube. In this clamp, there is no body attachment part for attaching to a body panel. In order to hold corrugated tubes of differing diameter, moreover, fastener cover locking pawls are formed in two stages; main fastener body locking pawls are also formed in two stages, and the differing diameters are dealt with by varying the combination of engagements of those locking pawls. This configuration has the advantage of being able to handle corrugated tubes of differing diameter with a single fastener cover, but still leaves room for improvement on the point of corrugated tube holding.

That being so, an object of the present invention is to provide a clamp for corrugated tubes that is capable of holding a corrugated tube with adequate holding force, whether that corrugated tube is one of large diameter or one of small diameter.

SUMMARY OF THE INVENTION

In order to achieve this object, a clamp for corrugated tubes for attaching a corrugated tube to a body panel is one that comprises a main fastener body for mounting and holding a corrugated tube, a body attachment part, integrally coupled to the main fastener body, for attaching that main fastener body to a body panel, and a fastener cover, coupled by a hinge to the main fastener body and capable of turning so as to close that main fastener body, for pressing a corrugated tube mounted in the main fastener body against the main fastener body when the main fastener body is in the closed state, working in harmony with the main fastener body to hold the corrugated tube; wherein the fastener cover comprises a small corrugated tube fastener cover for pressing against a corrugated tube of small diameter, and large corrugated tube fastener covers for pressing against a corrugated tube of large diameter; which small corrugated tube fastener cover and large corrugated tube fastener covers are disposed so as to be aligned in the axial direction of a corrugated tube being pressed against and held, each whereof is coupled to the main fastener body by the hinge so as to be able to press against and hold the corrugated tube on the main fastener body separately.

As described above, the fastener cover comprises a small corrugated tube fastener cover for pressing against a corrugated tube of small diameter and large corrugated tube fastener covers for pressing against a corrugated tube of large diameter, both fastener covers are disposed so as to be aligned in the axial direction of the corrugated tube being pressed against and held, and both, respectively, are coupled to the main fastener body by the hinge so as to be able to press against and hold corrugated tubes on the main fastener body separately. Therefore, a corrugated tube can be held with adequate holding force, whether it be a corrugated tube of large diameter or a corrugated tube of small diameter. Compared to a band clamp with which a corrugated tube is clamped with a band (cf. Patent Literature 2), moreover, the work of tightening with the band is rendered unnecessary, the time and labor for cutting off excess band [lengths] is rendered unnecessary, work time is shortened, and band waste resulting from cutting can be reduced.

In the clamp described above, the hinge is formed at one end of the main fastener body; in the small corrugated tube fastener cover and the large corrugated tube fastener covers, respectively, for the purpose of pressing and holding a corrugated tube in the main fastener body and locking in the closed state, cover locking means are formed, on the ends on the opposite side from the hinge, for engaging main body locking means formed at the other end of the main fastener body.

When in the closed state with the cover locking means of the small corrugated tube fastener cover engaged with the main body locking means, the cover locking means of the large corrugated tube fastener covers engage the main body locking means. In this way, the two fastener covers are maintained in a closed state.

When in the closed state with the cover locking means of the large corrugated tube fastener covers engaged with the main body locking means, in order to maintain a state such that the small corrugated tube fastener cover is turned on the main fastener body, a cover opening prevention surface is formed adjacent to the hinge of the large corrugated tube fastener covers, so as to come up against the end of the small corrugated tube fastener cover that is on the oppose end from the cover locking means. In this way, the two fastener covers are maintained in a closed state.

In the small corrugated tube fastener cover and the main fastener body at positions adjacent to the hinge, first guide means are formed for guiding the small corrugated tube fastener cover as it turns about the hinge. In this way, locking the small corrugated tube fastener cover in the closed state is made easy, and a definite lock is obtained, so this is highly effective in preventing unlocking.

In the large corrugated tube fastener covers and the main fastener body, at positions adjacent to the hinge, second guide means are formed for guiding the large corrugated tube fastener covers as they turn about the hinge. In this way, locking the large corrugated tube fastener covers in the closed state is made easy, and a definite lock is obtained, so this is highly effective in preventing unlocking.

In the clamp described above, moreover, the hinge is formed of a narrow, thin, panel-shaped piece that extends in the axial direction of the corrugated tube; in the panel-shaped piece between a first portion of the hinge to which the small corrugated tube fastener cover is coupled and second portions of the hinge to which the large corrugated tube fastener covers are coupled, cutouts are formed so that the small corrugated tube fastener cover and the large corrugated tube fastener covers, when they turn toward the main fastener body, turn together in the first half of that turning, but can turn separately in the latter half of the turning. In this way, when turning to the closed state, both fastener covers move together in the first half of the turning action, making handling easy, while in the latter half of turning, the holding of a corrugated tube of small diameter or large diameter can be made definite.

Ribs are formed in the main fastener body for meshing with grooves in a corrugated tube. Ribs are also formed in the small corrugated tube fastener cover for meshing with grooves in a corrugated tube of small diameter. By these ribs, a corrugated tube is held definitely, and whether a corrugated tube of large diameter or a corrugated tube of small diameter, the corrugated tube is, of course, prevented from shifting in the axial dimension, and shifting of the corrugated tube in lateral directions can also be prevented.

The body attachment part comprises a shank for insertion into an attachment hole in a body panel, and a pair of elastic latching pawls that extend from that shank toward the main fastener body in the shape of anchor arms and latching shoulders are formed, in the tip ends of the latching pawls, in a plurality of steps in the longitudinal direction of the latching pawls for latching on the edge of the attachment hole of the body panel; then that body attachment part can be attached even to a thin body panel and even to a thick body panel.

Furthermore, the large corrugated tube fastener covers are formed on both sides of the small corrugated tube fastener cover so as to sandwich the small corrugated tube fastener cover in the axial direction of the corrugated tube.

DETAILED DESCRIPTION OF THE PREFERRED EMBODIMENTS

Figure 1:
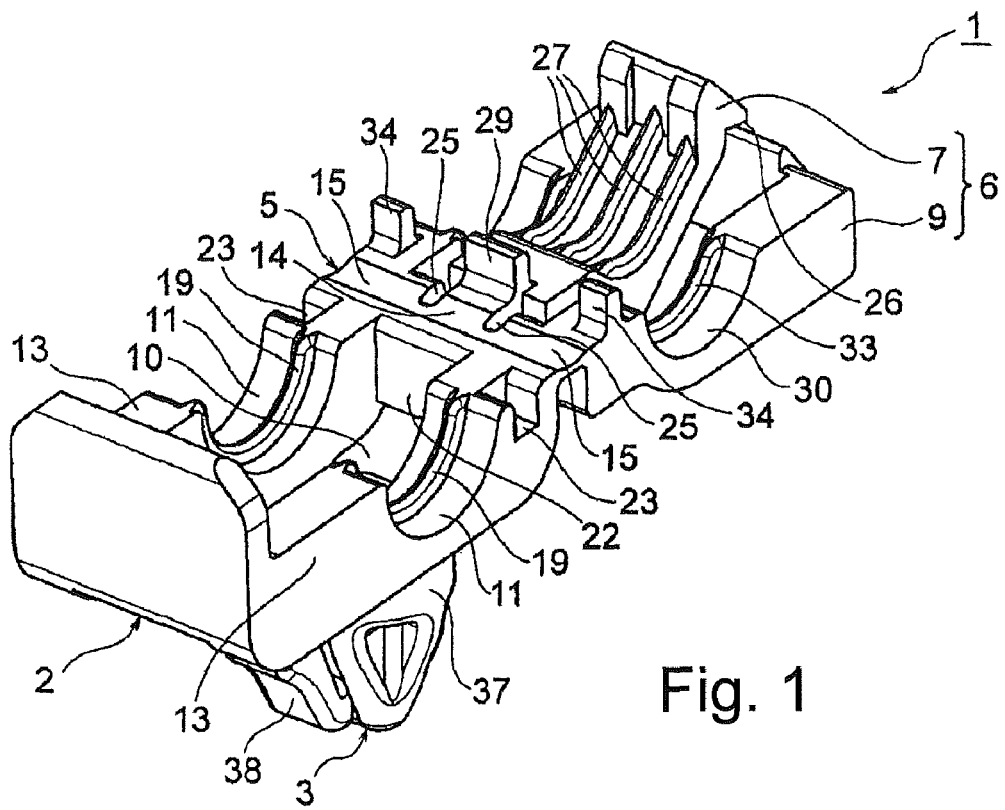
FIG. 1 is a diagonal view of a clamp for corrugated tubes relating to one embodiment of the present invention.
Figure 2:
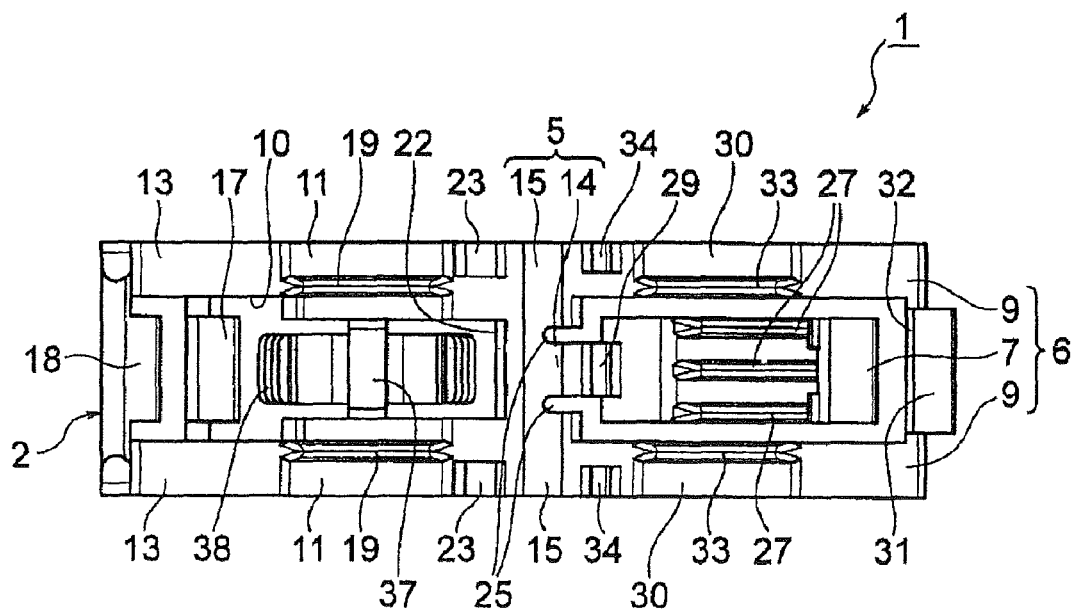
FIG. 2 is a plan of the clamp diagrammed in FIG. 1.
Figure 3:
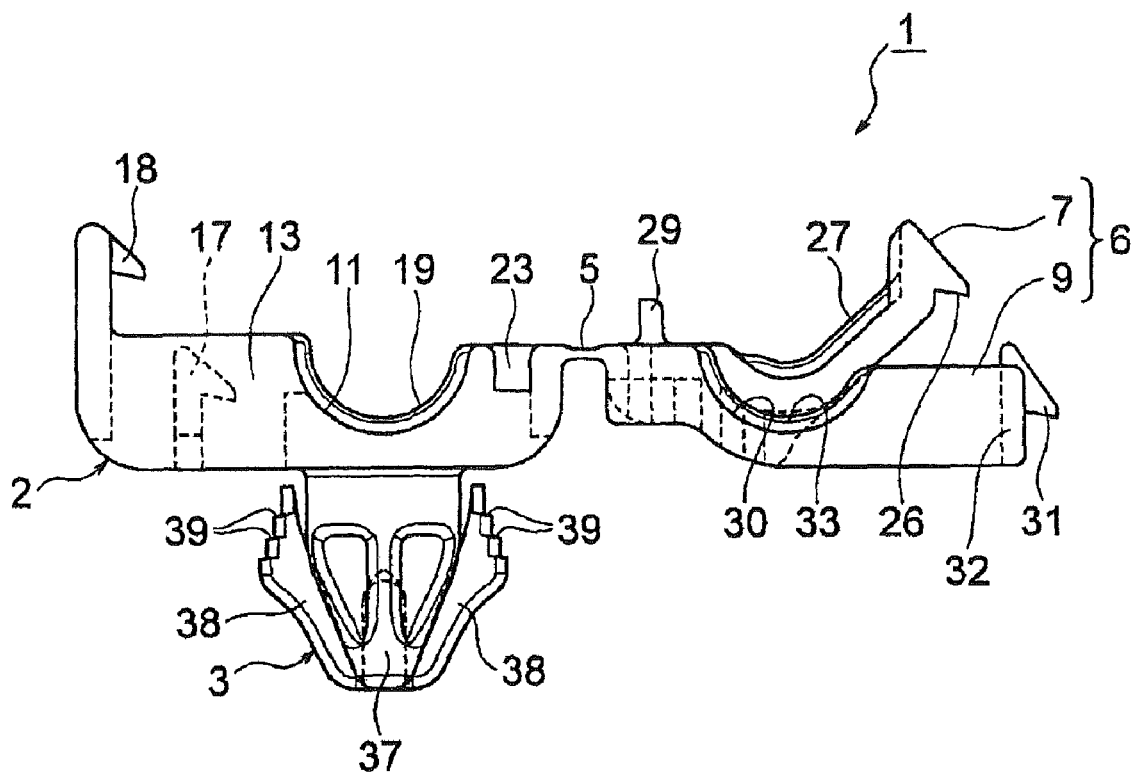
FIG. 3 is a front elevation of the clamp diagrammed in FIG. 1.
Figure 4:
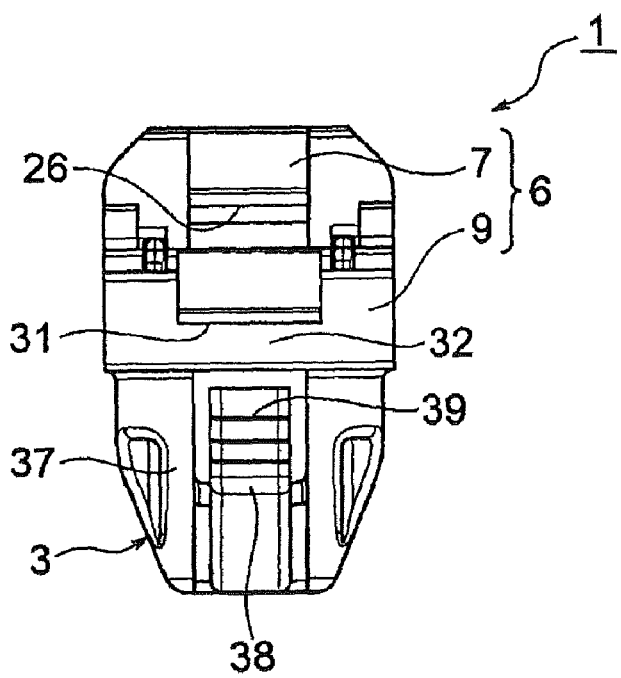
FIG. 4 is a right side elevation of the clamp diagrammed in FIG. 3.
Figure 5:
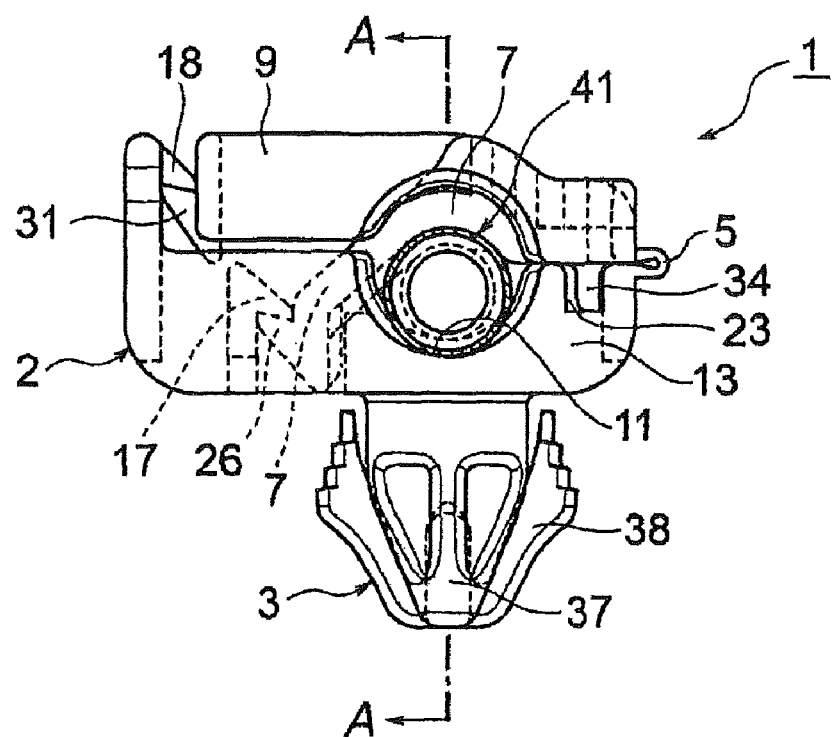
FIG. 5 is a front elevation of the clamp diagrammed in FIG. 1, holding a corrugated tube of small diameter.
Figure 6:
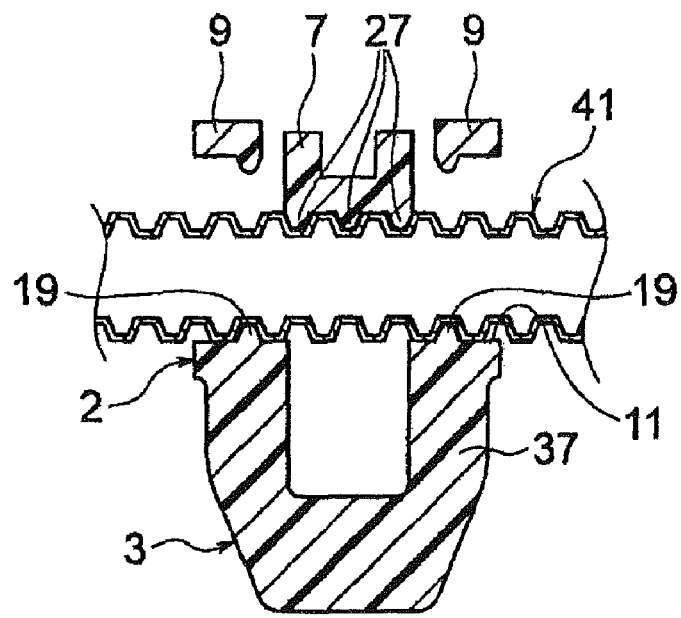
FIG. 6 is an end surface view at the A-A line [in FIG. 5] of the clamp diagrammed in FIG. 5.
Figure 7:
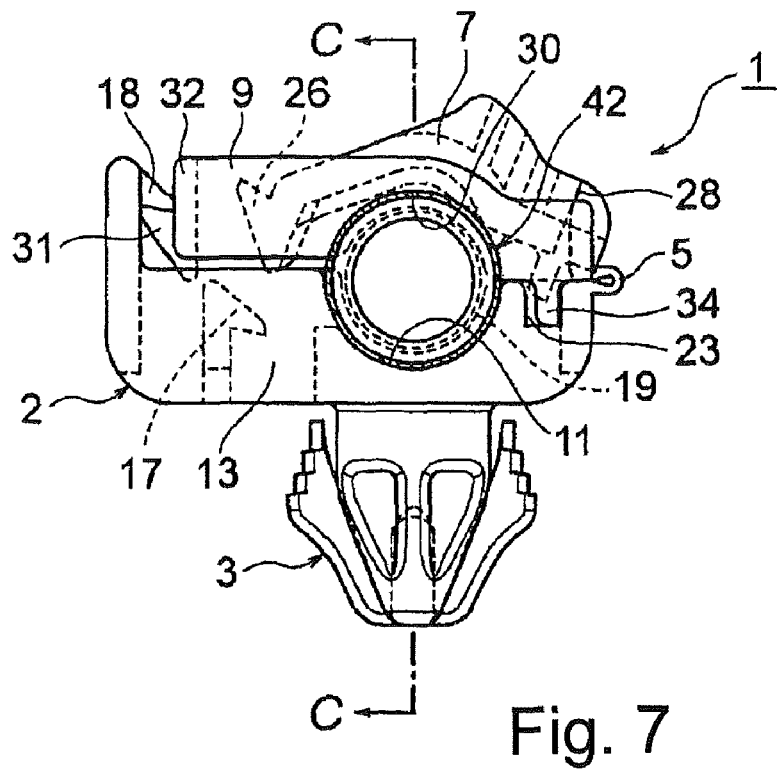
FIG. 7 is a front elevation of the clamp diagrammed in FIG. 1, holding a corrugated tube of large diameter.
Figure 8:
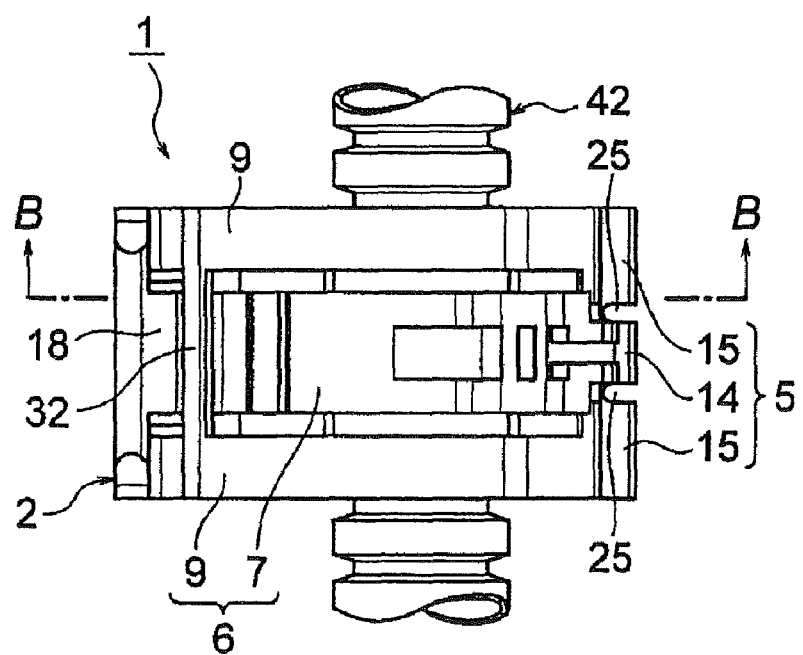
FIG. 8 is a plan of the clamp diagrammed in FIG. 7.

A clamp 1 for corrugated tubes that relates to one embodiment of the present invention is now described with reference to the drawings. In FIGS. 1 to 4, the clamp 1 is diagrammed in the open state wherein the upper surface of the main fastener body 2 is not covered by the fastener cover, that being the state prior to use. In FIGS. 5 and 6, a clamp 1 wherein a corrugated tube of small diameter is held is diagrammed. In FIGS. 7 to 11, a clamp 1 wherein a corrugated tube of large diameter is held is diagrammed.

Figure 12:
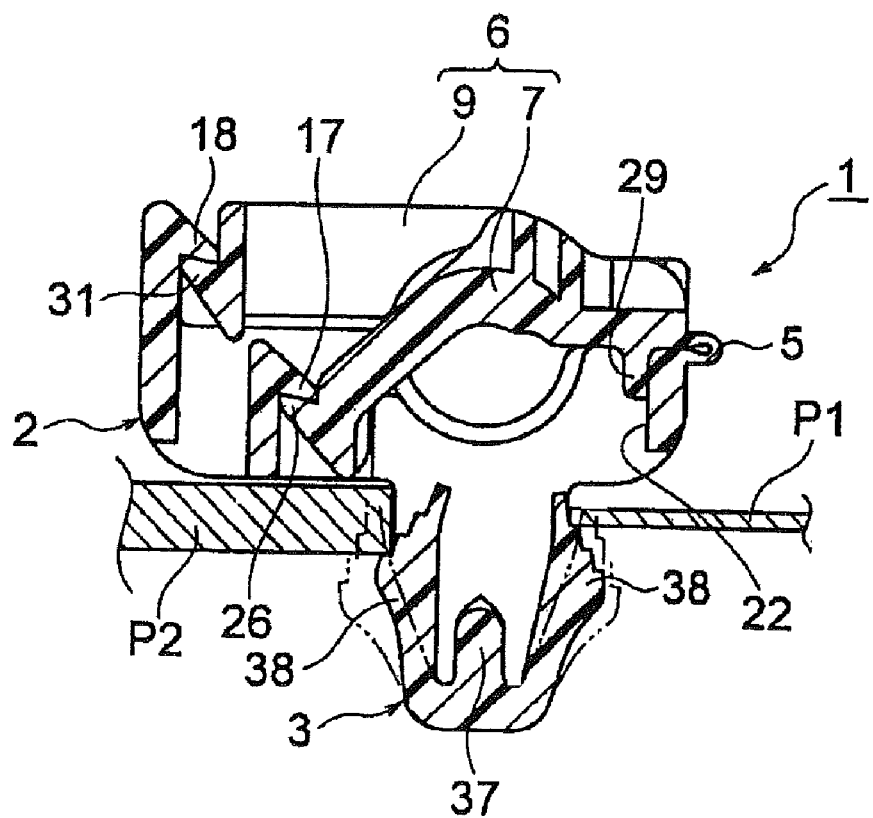
FIG. 12 is a vertical section in a direction perpendicular to the A-A line [in FIG. 5] of the clamp diagrammed in FIG. 5.

In FIG. 12, a body attachment part that is attached to body panels of differing thickness is diagrammed.

The clamp 1 is now described in detail with reference to FIGS. 1 to 4. The clamp 1 is integrally formed of a hard plastic material. The clamp 1 comprises a main fastener body 2 for mounting and holding a corrugated tube, a body attachment part 3, coupled integrally to the main fastener body 2, for attaching the main fastener body to a body panel and a fastener cover 6 that is coupled by a hinge 5 to the main fastener body 2 and is capable of turning so as to close the corrugated tube mounting surface of the main fastener body 2. The fastener cover 6, in the closed state wherein the corrugated tube mounting surface of the main fastener body 2 is closed, presses a corrugated tube mounted on the main fastener body 2 against the main fastener body 2 and works in concert with the main fastener body 2 to hold the corrugated tube. The main fastener body 2, moreover, exhibits high rigidity. Furthermore, the fastener cover 6 has elastic latching pawls that are shaped as anchor arms, which, in the embodiment diagrammed, are for insertion into an attachment hole in a body panel so as to be attached thereto.

In the clamp 1, the fastener cover 6 comprises a small corrugated tube fastener cover 7 for pressing against a corrugated tube of small diameter and large corrugated tube fastener covers 9 for pressing against a corrugated tube of large diameter.

The small corrugated tube fastener cover 7 and the large corrugated tube fastener covers 9 are disposed so as to be aligned in the axial direction of the corrugated tube. In the embodiment diagrammed, the large corrugated tube fastener covers 9 are formed on both sides of the small corrugated tube fastener cover 7, sandwiching the small corrugated tube fastener cover 7 therebetween, in the axial direction of the corrugated tube. The small corrugated tube fastener cover 7 and the large corrugated tube fastener covers 9 are coupled, respectively, to the main fastener body by the hinge 5 so that they can press and hold a corrugated tube on the upper surface of the main fastener body 2 separately against the main fastener body 2. Thus, the fastener cover 6 comprises the small corrugated tube fastener cover 7 for pressing against a corrugated tube of small diameter and the large corrugated tube fastener covers 9 for pressing against a corrugated tube of large diameter. Both fastener covers 7 and 9 are disposed so as to be aligned in the axial direction of the corrugated tube and are respectively coupled to the main fastener body 2 by the hinge 5 so as to be able separately to press and hold a corrugated tube on the main fastener body, against the main fastener body 2. Therefore, a corrugated tube, whether one of large diameter or one of small diameter, can be held with adequate holding force. The small corrugated tube fastener cover 7 and the large corrugated tube fastener covers 9, moreover, each exhibit high rigidity. Alternatively, the large corrugated tube fastener covers 9 can be formed as a single part that is integrally joined together at the end opposite the hinge 5 so that the cover 9 is generally U-shaped.

The main fastener body 2 forms a mounting surface that can stably mount corrugated tubes whether they are of large diameter or small diameter. In the center of the main fastener body 2, a space 10 is formed to make it possible to shut [the clamp] so that the small corrugated tube fastener cover 7 presses against a corrugated tube of small diameter. On both sides of the this space 10, rigid panel-shaped frames 13 are provided in a pair, in the centers of which circular recesses 11 are formed in line with a lateral cross-section of a corrugated tube. At one end of the frames 13 (the right end in FIGS. 1 to 3), a hinge 5 is provided. This hinge 5, as diagrammed, is formed of a narrow, thin, panel-shaped piece that extends in the axial direction of the corrugated tube. Furthermore, this hinge 5 comprises a first portion 14 to which the small corrugated tube fastener cover 7 is coupled and second portions 15 to which the large corrugated tube fastener covers 9 are coupled. At one end of the main fastener body 2 (the end opposite from the hinge 5), a first main body locking pawl 17 and a second main body locking pawl 18 are formed as main body locking means, which, respectively, engage with a first cover locking pawl as locking means for the small corrugated tube fastener cover 7 and, with a second cover locking pawl as locking means for the large corrugated tube fastener covers 9, press and hold the corrugated tube against the main fastener body, and lock [the clamp in] the closed state.

On the corrugated tube mounting surface side of the recesses 11 of the frames 13, ribs 19 are formed, extending in the longitudinal direction of the frames 13, for meshing with the grooves in the corrugated tube. In order to insure the rigidity of the main fastener body 2, the bottom of the main fastener body 2 is coupled integrally with the shank 37 of the body attachment part 3, except for a hole portion therein for forming a latching pawl 38 of the body attachment part 3. In the end adjacent to the hinge 5, furthermore, a first guide hole 22 is formed as first guide means for guiding the turning of the small corrugated tube fastener cover 7 about the hinge 5, and second guide holes 23 are formed as second guide means for guiding the turning of the large corrugated tube fastener covers 9 about the hinge 5. By these, locking the small corrugated tube fastener cover 7 or the large corrugated tube fastener covers 9 in the closed state is facilitated, and a definite lock is obtained, which is highly effective to prevent unlocking.

The hinge 5 is formed of a narrow, thin, panel-shaped piece that extends in the axial direction of the corrugated tube, and comprises one first portion 14 to which the small corrugated tube fastener cover 7 is coupled, and two second portions 15 to which the large corrugated tube fastener covers 9 are coupled. Between the first portion 14 and the two second portions 15, two cutouts 25 are formed, so that when the small corrugated tube fastener cover 7 and the large corrugated tube fastener covers 9 turn toward the main fastener body 2, in the first half of that turning, they turn together; however, in the latter half of that turning, they can turn separately. In this way, when turning to the closed state, both of the fastener covers move together in the first half of the turning action, so handling is made easy, while in the latter half of the turning, the holding of a corrugated tube of either small diameter or large diameter can be made definite.

The small corrugated tube fastener cover 7 is coupled to one end of the main fastener body 2 by the first portion 14 of the hinge 5. Furthermore, the small corrugated tube fastener cover 7 is formed in the center between the two large corrugated tube fastener covers 9, and turns about the first portion 14 of the hinge 5 so as to enter into the space 10 in the center of the main fastener body 2. The small corrugated tube fastener cover 7 is formed in a shape that, overall, after curving at an intermediate position corresponding to the recesses 11, extends narrowly to the other end thereof so as to press a corrugated tube of small diameter against the recesses 11 of the main fastener body 2 and hold it [there]. At the tip end of the small corrugated tube fastener cover 7, a first cover locking pawl 26 is formed as locking means for engaging the first main body locking pawl 17 on the main fastener body 2. By the first cover locking pawl 26 engaging with the first main body locking pawl 17, a corrugated tube of small diameter mounted in the space 10 of the main fastener body 2 is pressed against and held so as to be held with adequate holding force, and that holding is locked.

On the surface of the small corrugated tube fastener cover 7 that presses against the corrugated tube, ribs 27 that mesh with the grooves in a corrugated tube of small diameter are formed in a plurality (three in number in the example diagrammed). The intervals between these ribs 27 are formed so as to match the pitch of the grooves in the corrugated tube of small diameter. By these ribs 27, the corrugated tube of small diameter is, of course, prevented from shifting in the axial dimension, and shifting in lateral directions can also be prevented. When the ribs 19 of the main fastener body 2 mesh with the grooves in a corrugated tube of small diameter, the effectiveness of preventing shifting of the corrugated tube in the axial direction and of preventing shifting in lateral directions is made even greater. In the small corrugated tube fastener cover 7, at a position adjacent to the first portion 14 of the hinge 5, a first guide projection 29 is formed as first guide means for guiding the turning of the small corrugated tube fastener cover 7 about the hinge 5. The first guide projection 29 mates with the first guide hole 22 of the main fastener body during the turning of the small corrugated tube fastener cover 7 to the closed state. In this way, locking the small corrugated tube fastener cover 7 in the closed state is made easy, and definite locking is realized, so unlocking is prevented. The end surface 28 of the small corrugated tube fastener cover 7, as diagrammed in FIGS. 9 and 11, when the large corrugated tube fastener covers 9 are in the closed state, is formed so as to come up against a cover opening prevention surface formed at the end of the large corrugated tube fastener covers 9, adjacent to the hinge 5, so as to reach a state where it has turned together with the large corrugated tube fastener covers 9. In this way, the small corrugated tube fastener cover 7 is maintained, together with the large corrugated tube fastener covers 9, in a closed state.

The large corrugated tube fastener covers 9 are coupled to one end of the main fastener body 2 by the second portions 15 of the hinge 5. The large corrugated tube fastener covers 9, moreover, are formed on both sides of the small corrugated tube fastener cover 7 which is in the center and turn about the two second portions 15 of the hinge 5 so as to face the frames 13 on both sides of the main fastener body 2. The large corrugated tube fastener covers 9 have semicircular curved parts 30 at positions corresponding to the recesses 11 so that, overall, a corrugated tube of large diameter is pressed and held in the recesses 11 of the frames 13 of the main fastener body 2 and are formed toward the other end thereof in the form of lengthily extending panel-shaped frames. At the tip ends of the large corrugated tube fastener covers 9, a second cover lock pawl 31 is formed as locking means for engaging with the second main body locking pawl 18 of the main fastener body 2. By the second cover lock pawl 31 engaging the second main body locking pawl 18, the corrugated tube of large diameter mounted in the recess(es) 10 [sic] of the main fastener body 2 is pressed against and held so as to be held with adequate holding force, and that holding is locked. In the large corrugated tube fastener covers 9, the second cover lock pawl 31 portion thereof is formed as an arm 32 that couples the hinge 5 to the opposite end. This arm 32 is coupled so that the two large corrugated tube fastener covers 9 can turn together.

Figure 9:
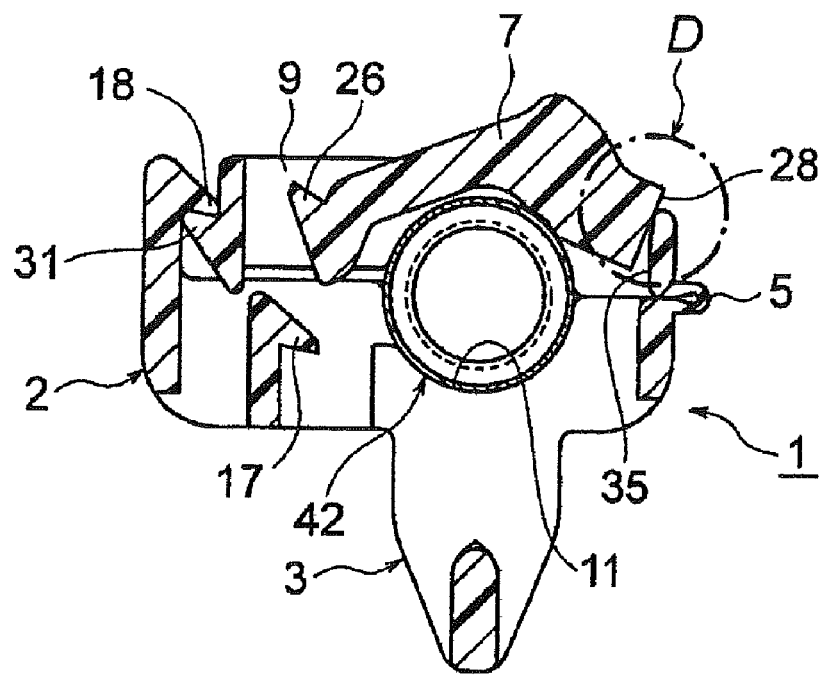
FIG. 9 is a section, at the B-B line [in FIG. 8] of the clamp diagrammed in FIG. 8.
Figure 10:
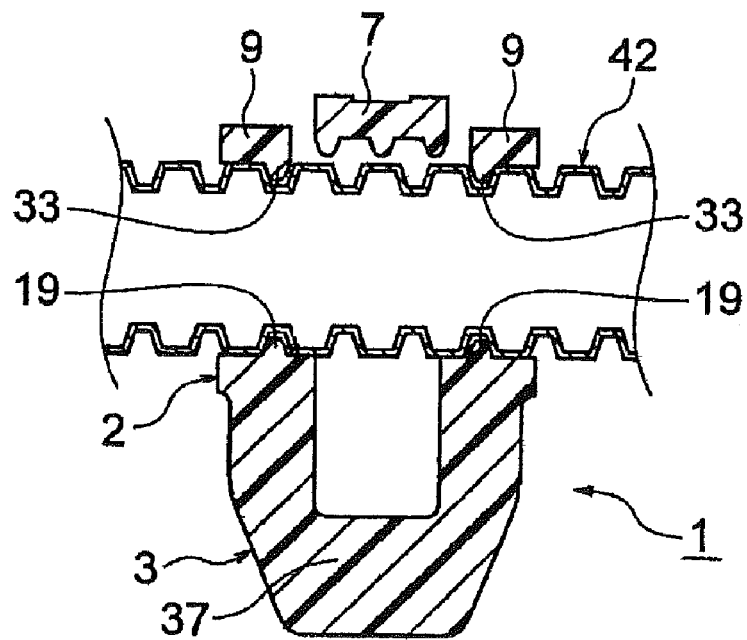
FIG. 10 is an end surface view at the C-C line [in FIG. 7] of the clamp diagrammed in FIG. 7.
Figure 11:
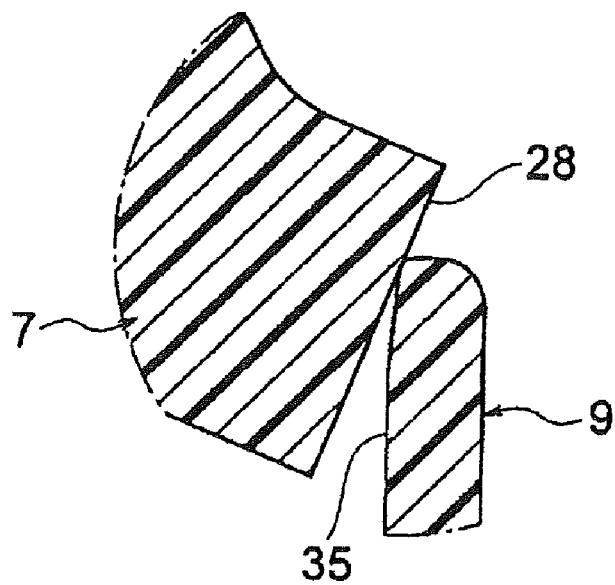
FIG. 11 is an enlarged view of the circular D portion of the clamp diagrammed in FIG. 9.

On the surfaces of the large corrugated tube fastener covers 9 that press against the corrugated tube, ribs 33 are formed for meshing with the grooves in a corrugated tube of large diameter. By these ribs 33, shifting of the corrugated tube of large diameter in the axial direction is prevented and shifting in lateral directions is also prevented. When the ribs 19 of the main fastener body 2 mesh with the grooves of the corrugated tube of large diameter, the effectiveness both of corrugated tube shift prevention in the axial direction thereof and of shift prevention in lateral directions becomes even greater. In the large corrugated tube fastener covers 9 at positions adjacent to the second portions 15 of the hinge 5, second guide projections 34 are formed as second guide means for guiding the turning of the large corrugated tube fastener covers 9 about the hinge 5. The second guide projections 34 mate with second guide holes 23 in the main fastener body when the large corrugated tube fastener covers 9 turn to the closed state. In this way, locking the large corrugated tube fastener covers 9 in the closed state is made easy, and definite locking is realized, so unlocking is prevented. The end surfaces 35 of the large corrugated tube fastener covers 9 adjacent to the hinge 5, as diagrammed in FIGS. 9 and 11, are formed as cover opening prevention surfaces 35 that when the large corrugated tube fastener covers 9 are in the closed state, come up against the end surface of the small corrugated tube fastener cover 7 so that the small corrugated tube fastener cover 7, together with the large corrugated tube fastener covers 9, attains a turned condition. In this way, when a corrugated tube of large diameter is held, the small corrugated tube fastener cover 7 together with the large corrugated tube fastener covers 9 is maintained in the closed state.

In the embodiment diagrammed in the drawings, the body attachment part 3 is formed in a shape that descends down from the main fastener body 2 and is inserted into an attachment hole of a body panel and attached to the body panel. The body attachment part 3 is now described with reference to FIGS. 3, 4 and 12. The body attachment part 3 comprises a shank 37 that is inserted into a attachment hole in a body panel and a pair of elastic latching pawls 38 that extend diagonally from the tip end (lower end) of the shank 37 toward the main fastener body 2 in the shape of anchor arms. At the tip end of each latching pawl, latching shoulders 39 for latching on the edge of the attachment hole in the body panel are formed in a plurality of steps in the longitudinal direction of the latching pawls 38. In this way, as diagrammed in FIG. 12, the body attachment part 3 can be attached both to a thin body panel P1 diagrammed on the right side in FIG. 12 and to a thick body panel P2 diagrammed on the left side in FIG. 12. The shank 37, furthermore, should preferably be formed so that as diagrammed in FIG. 4 (and in FIG. 1), the portion thereof which engages the edges of the attachment hole in the body panel, in that portion excluding the latching pawls 38, becomes greater (with a shape close to the shape of the attachment hole in the lateral cross-section thereof), so that in this way, fastening to the attachment hole is stabilized. However, the body attachment part 3 may be of some other shape, such as that of a latching part for a stud, as described in Patent Literature 1, for example.

The way in which a corrugated tube of small diameter 41 is held in a clamp 1 configured in this manner shall now be described with reference to FIGS. 5, 6 and 12 (with the corrugated tube of small diameter 41 not shown in FIG. 12, for convenience). The corrugated tube of small diameter 41 is mounted in the recesses 11 of the frames 13 of the main fastener body 2, and the small corrugated tube fastener cover 7 of the fastener cover 6 is turned about the hinge 5 to the closed state. By that turning, the large corrugated tube fastener covers 9 are also turned together. As soon as the corrugated tube of small diameter 41 begins to make contact with the small corrugated tube fastener cover 7, a worker intensifies the turning action and presses the corrugated tube of small diameter 41 against the recesses 11 of the frames 13. By this pressing, the first cover locking pawl 26 of the small corrugated tube fastener cover 7 engages the first main body locking pawl 17 of the main fastener body 2, upon which the corrugated tube of small diameter 41 is firmly held in the clamp 1 and that holding is locked. When the large corrugated tube fastener covers 9 are also turned together with the turning of the small corrugated tube fastener cover 7, the second cover lock pawl 31 engages the second main body locking pawl 18 of the main fastener body 2, locking the large corrugated tube fastener covers 9 in the closed state. This operation is diagrammed in FIGS. 5 and 12. Then, as diagrammed in FIG. 6, the three ribs 27 of the small corrugated tube fastener cover 7 are meshed with the grooves of the corrugated tube of small diameter 41, and in this way, the corrugated tube of small diameter 41 is prevented from shifting in the axial direction thereof and is further prevented from shifting in a lateral direction. As diagrammed in FIG. 6, the ribs 19 of the main fastener body 2 are meshed with the grooves of the corrugated tube of small diameter 41, and in this way, both the shift prevention effectiveness in the axial direction of the corrugated tube of small diameter 41 and the shift prevention effectiveness in lateral directions are made even greater.

Next, the way in which a corrugated tube of large diameter 42 is held in the clamp 1 shall be described, with reference to FIGS. 7 to 11. The corrugated tube of large diameter 42 is mounted in the recesses 11 of the frames 13 of the main fastener body 2. The worker, holding the arm 32 connecting the ends of the two large corrugated tube fastener covers 9, turns the two large corrugated tube fastener covers 9 about the hinge 5 so as to effect a closed state. By that turning, the small corrugated tube fastener cover 7 is also turned together therewith, but that turning stops as soon as [the small corrugated tube fastener cover 7] makes contact with the corrugated tube of large diameter 42. Meanwhile, the worker turns the two large corrugated tube fastener covers 9 which start to come up against the corrugated tube of large diameter 42. The worker then further intensifies the turning action, and so the corrugated tube of large diameter 42 is pressed against the recesses 11 of the frames 13 by the large corrugated tube fastener covers 9. By that pressing, the second cover lock pawl 31 of the large corrugated tube fastener covers 9 engages the second main body locking pawl 18 of the main fastener body 2, the corrugated tube of large diameter 42 is held firmly in the clamp 1, and that holding is locked. This operation is diagrammed in FIGS. 7 to 9. Then, as diagrammed in FIG. 10, the ribs 33 of the two large corrugated tube fastener covers 9 are meshed with the grooves of the corrugated tube of large diameter 42, and in this way, the corrugated tube of large diameter 42 is prevented from shifting in the axial direction thereof and further is prevented from shifting in a lateral direction. As diagrammed in FIG. 10, moreover, the ribs 19 of the frames 13 facing the large corrugated tube fastener covers 9 are meshed with the grooves of the corrugated tube of large diameter 42, and in this way, both the shift prevention effectiveness in the axial direction of the corrugated tube of large diameter 42 and the shift prevention effectiveness in lateral directions are made even greater.

The small corrugated tube fastener cover 7 stops when it has come up against the corrugated tube of large diameter 42 and cannot turn further, so the first cover locking pawl 26 cannot engage the first main body locking pawl 17. That being so, the small corrugated tube fastener cover 7 will be in a state of having turned incompletely, which is undesirable. To counter this, when the large corrugated tube fastener covers 9 are in the closed state, the end surfaces 35 of the large corrugated tube fastener covers 9 adjacent to the hinge 5 are formed as cover opening prevention surfaces 35 which, when the large corrugated tube fastener covers 9 are in the closed state, come up against the end surface of the small corrugated tube fastener cover 7 so that the small corrugated tube fastener cover 7 will be in a state of having turned together with the large corrugated tube fastener covers 9, as diagrammed in FIGS. 9 and 11.

As a consequence, when a corrugated tube of large diameter is held, as soon as the large corrugated tube fastener covers 9 are placed in the closed state, the cover opening prevention surfaces 35 will have come up against the end surface 28 of the small corrugated tube fastener cover 7, as diagrammed in FIG. 11, and maintain the small corrugated tube fastener cover 7 and the large corrugated tube fastener covers 9 together in the closed state.

In the embodiment described above, furthermore, two types of fastener cover, namely the small corrugated tube fastener cover 7 and the large corrugated tube fastener covers 9, are formed, but additional corrugated tube fastener covers may be provided outside of the large corrugated tube fastener covers 9 (that is, on both sides of the large corrugated tube fastener covers 9), so that a corrugated tube of a different diameter can be held. It is also possible to provide more fastener covers than that so as to hold corrugated tubes of many diameters.

The invention claimed is:

1. A clamp for corrugated tubes, for attaching a corrugated tube to a body panel, comprising:
a main fastener body defining a concave bearing surface for mounting and holding the corrugated tube; a body attachment part, integrally coupled to said main fastener body for attaching said main fastener body to the body panel; and a fastener cover, coupled by a hinge to said main fastener body and capable of rotating so as to close the main fastener body, for pressing the corrugated tube mounted in the main fastener body against the main fastener body when the main fastener body is in the closed state, and cooperating with the main fastener body to hold the corrugated tube; wherein:
said fastener cover comprises a small corrugated tube fastener cover for pressing against a corrugated tube of small diameter, and two large corrugated tube fastener covers for pressing against a corrugated tube of large diameter; which the small corrugated tube fastener cover and the large corrugated tube fastener cover are disposed so as to be aligned in the axial direction of the corrugated tube being pressed and held in the main fastener body, each of which is coupled to said main fastener body by said hinge so as to be capable of separately pressing against and holding the corrugated tube on the main fastener body.

2. The clamp according to claim 1, wherein said hinge is formed at one end of said main fastener body, and further wherein each of said small corrugated tube fastener cover and said large corrugated tube fastener cover includes cover locking means formed on the ends of said covers opposite from said hinge for engaging main body locking means formed at the other end of said main fastener body, to lock said covers in a closed state.

3. The clamp according to claim 2, configured such that when in said closed state with said cover locking means of said small corrugated tube fastener cover engaged with said main body locking means, said cover locking means of said large corrugated tube fastener cover also engages said main body locking means.

4. The clamp according to claim 2, wherein when in said closed state with said cover locking means of said large corrugated tube fastener cover engaged with said main body locking means, in order to maintain a state such that the small corrugated tube fastener cover is rotated on said main fastener body, a cover opening prevention surface is formed adjacent to said hinge of said large corrugated tube fastener cover, so as to come up against the end of said small corrugated tube fastener cover that is on the opposite end from said cover locking means.

5. The clamp according to claim 2, wherein in said small corrugated tube fastener cover and said main fastener body, at positions adjacent to said hinge, first guide means are formed for guiding said small corrugated tube fastener cover as it rotates about said hinge.

6. The clamp according to claim 2, wherein in said large corrugated tube fastener cover and said main fastener body, at positions adjacent to said hinge, second guide means are formed for guiding said large corrugated tube fastener cover as it rotates about said hinge.

7. A clamp according to claim 1, wherein ribs are formed in said main fastener body for meshing with grooves in a corrugated tube.

8. The clamp according to claim 1, wherein ribs are formed in said small corrugated tube fastener cover for meshing with grooves in a corrugated tube of small diameter.

9. The clamp according to claim 1, wherein said body attachment part comprises a shank for insertion into an attachment hole in a body panel and a pair of elastic latching pawls that extend from that shank toward said main fastener body in the shape of anchor arms; and latching shoulders are formed, in the tip ends of said latching pawls, in a plurality of steps in the longitudinal direction of the latching pawls for latching on the edge of the attachment hole of said body panel; whereupon the body attachment part can be attached to a thin body panel and to a thick body panel.

10. The clamp according to claim 1, wherein said large corrugated tube fastener cover is formed on both sides of said small corrugated tube fastener cover so as to sandwich the small corrugated tube fastener cover in the axial direction of the corrugated tube.

11. The clamp according to claim 1, wherein at least one rib is formed in said large corrugated tube fastener covers for meshing with grooves in a corrugated tube of larger diameter.

12. The clamp according to claim 1, wherein the smaller corrugated tube fastener cover is disposed between the two large corrugated tube fastener covers.

13. The clamp according to claim 1, wherein the small corrugated tube fastener is coupled to the fastener main body by a first portion of the hinge.

14. The clamp according to claim 13, wherein the two large corrugated tube fasteners are coupled to the fastener main body by a second portion of the hinge.

15. A clamp for corrugated tubes, for attaching a corrugated tube to a body panel, comprising:

a main fastener body for mounting and holding the corrugated tube; a body attachment part, integrally coupled to said main fastener body for attaching said main fastener body to the body panel; and a fastener cover, coupled by a hinge to said main fastener body and capable of rotating so as to close the main fastener body, for pressing the corrugated tube mounted in the main fastener body against the main fastener body when the main fastener body is in the closed state, and cooperating with the main fastener body to hold the corrugated tube; wherein:

said fastener cover comprises a small corrugated tube fastener cover for pressing against a corrugated tube of small diameter, and a large corrugated tube fastener cover for pressing against a corrugated tube of large diameter; which the small corrugated tube fastener cover and the large corrugated tube fastener cover are disposed so as to be aligned in the axial direction of the corrugated tube being pressed and held in the main fastener body, each of which is coupled to said main fastener body by said hinge so as to be capable of separately pressing against and holding the corrugated tube on the main fastener body; and wherein said hinge is formed of a narrow, thin, panel-shaped piece that extends in the axial direction of the corrugated tube; and, in said panel-shaped piece between a first portion of said hinge to which said small corrugated tube fastener cover is coupled and a second portion of said hinge to which said large corrugated tube fastener cover is coupled, a cutout is formed so that said small corrugated tube fastener cover and said large corrugated tube fastener cover, when they rotate toward said main fastener body, rotate together in the first half of that rotation but can rotate separately in the latter half of said rotation.

* * * * *

UNITED STATES PATENT AND TRADEMARK OFFICE
CERTIFICATE OF CORRECTION

| | | |
|---|---|---|
| PATENT NO. | : 8,020,812 B2 | Page 1 of 1 |
| APPLICATION NO. | : 12/633328 | |
| DATED | : September 20, 2011 | |
| INVENTOR(S) | : Hiroto Matsuno et al. | |

It is certified that error appears in the above-identified patent and that said Letters Patent is hereby corrected as shown below:

On the Title Page Item (73) Assignee,
Insert -- Sumitomo Wiring Systems, LTD., Yokkaichi City, Mie Prefecture, JAPAN --.

Signed and Sealed this
Twelfth Day of November, 2013

Teresa Stanek Rea
*Deputy Director of the United States Patent and Trademark Office*